United States Patent [19]

Krebs et al.

[15] 3,673,802
[45] July 4, 1972

[54] FAN ENGINE WITH COUNTER ROTATING GEARED CORE BOOSTER

[72] Inventors: James Norton Krebs, Marblehead, Mass.; Peter G. Kappus, Cincinnati, Ohio

[73] Assignee: General Electric Company

[22] Filed: June 18, 1970

[21] Appl. No.: 47,236

[52] U.S. Cl. ..........................60/226, 60/39.16 C, 60/262, 60/268
[51] Int. Cl. ..................................................F02k 3/06
[58] Field of Search ......................60/262, 39.16, 268, 226

[56]  References Cited

UNITED STATES PATENTS

| | | | |
|---|---|---|---|
| 3,381,475 | 5/1968 | Roberts | 60/268 X |
| 3,448,582 | 6/1969 | Bracey | 60/39.16 X |
| 3,391,540 | 7/1968 | Bauger | 60/39.16 X |

FOREIGN PATENTS OR APPLICATIONS

| | | | |
|---|---|---|---|
| 767,704 | 5/1953 | Germany | 60/39.16 |

Primary Examiner—Clarence R. Gordon
Attorney—Derek P. Lawrence, Edward S. Roman, Frank L. Neuhauser, Oscar B. Waddell and Joseph B. Forman

[57]  ABSTRACT

The disclosure describes a turbofan engine having high and low pressure compressors wherein the low pressure compressor, or booster, comprises two counter rotating elements, a rotating duct which carries fan blades on its exterior surface and compressor blades on its interior surface and a conventional compressor rotor which rotates in a direction counter to the direction of rotation of the rotating duct. Alternative gearing schemes for coupling the rotation of the fan to the rotation of the low pressure compressor are shown.

5 Claims, 3 Drawing Figures

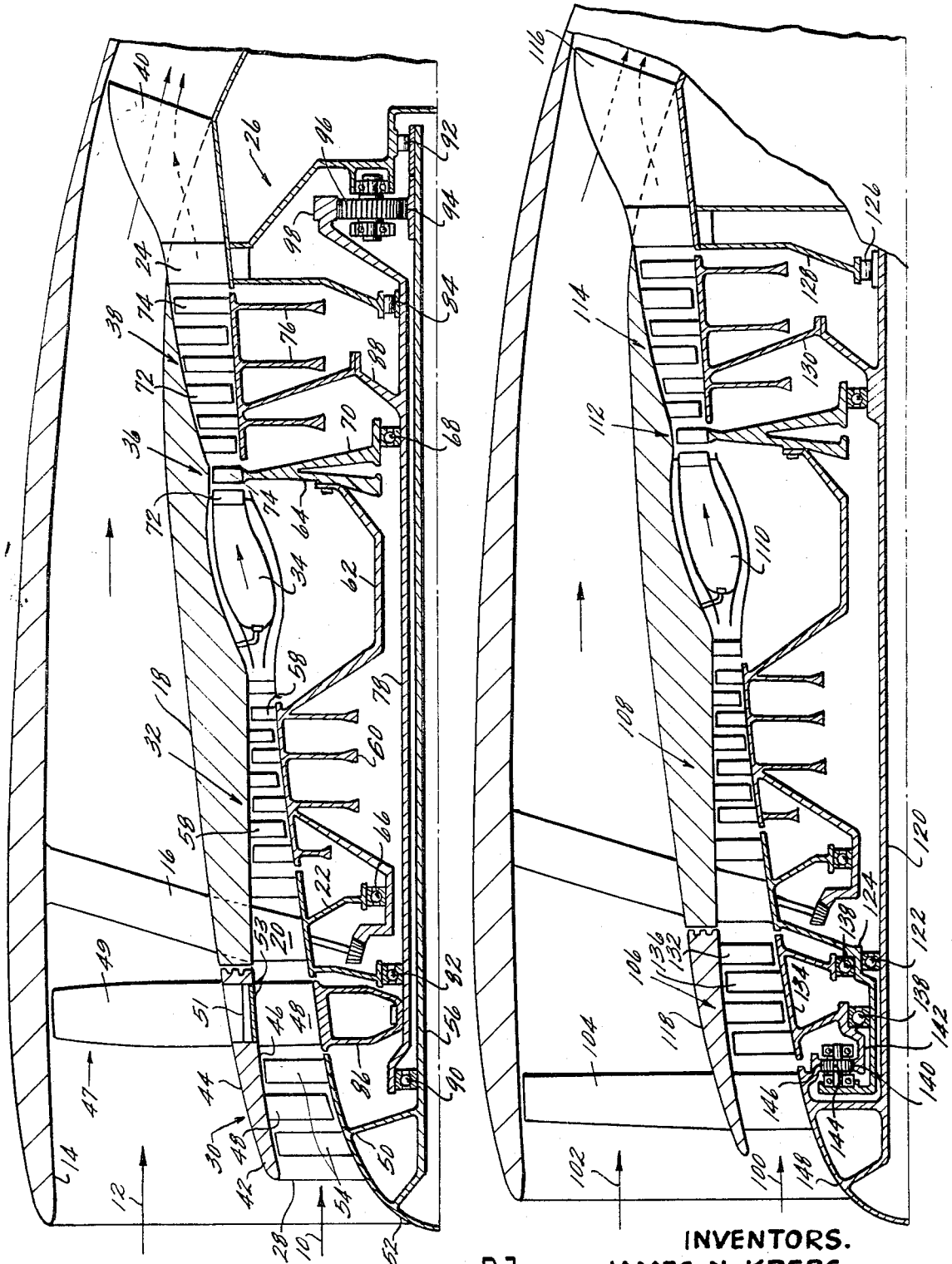

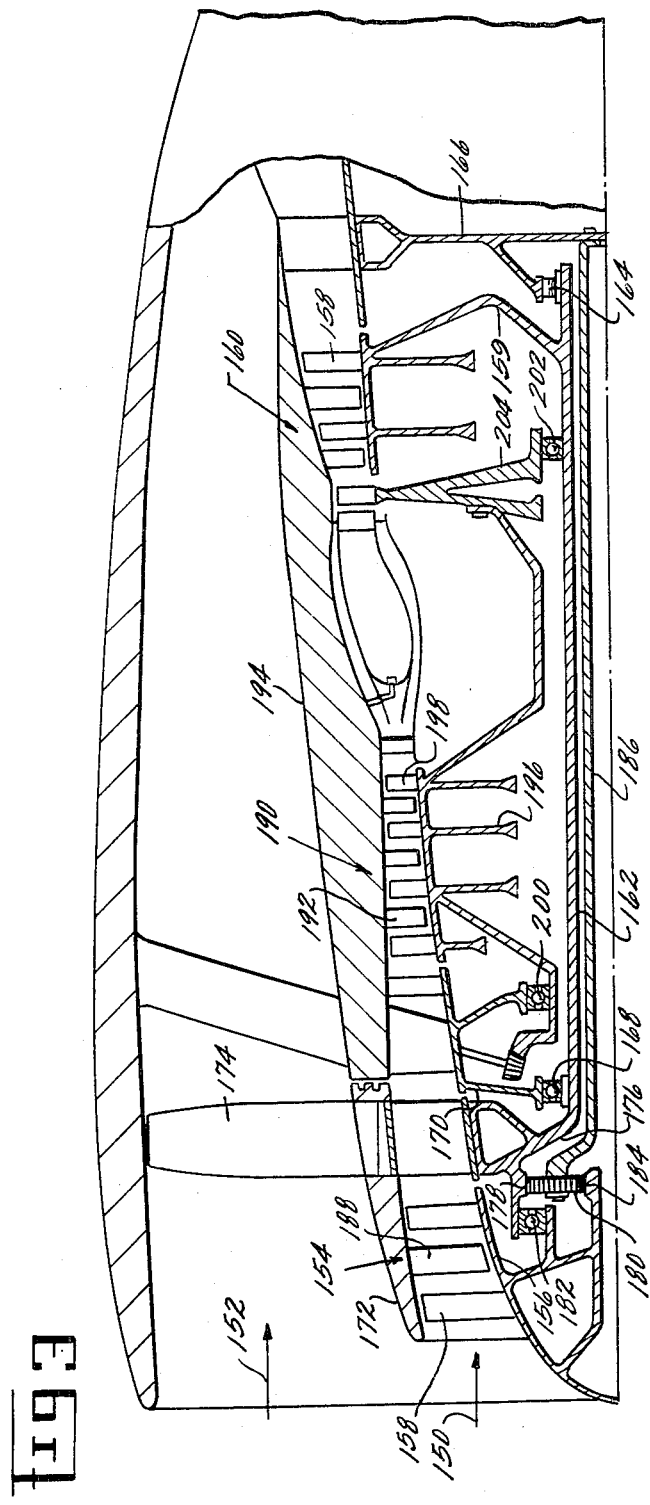

FAN ENGINE WITH COUNTER ROTATING GEARED CORE BOOSTER

BACKGROUND OF THE INVENTION

This invention relates to gas turbine aircraft engines and more particularly to turbofan engines designed to take advantage of continually increasing turbine temperature capability.

It is axiomatic that the thermal efficiency of gas turbine engine cycles will increase with increasing pressure and temperature levels in the engines. An upper limit on these levels has always been dictated by the practical limitations of engineering material; however, there has been a continuing increase in aircraft engine operating pressures and temperatures permitted by increasing development in materials technology and hot part cooling techniques. Improvements in temperature capability are not had without paying a price in engine complexity and trading off some performance potential in the form of air bled from the engine compressor to supply cooling air for the engine hot parts. Compressor design is thus interrelated with hot part design for achieving increased temperature capability so that it becomes necessary to maximize efficiency of the compression process in a gas turbine engine to obtain a favorable tradeoff between the advantages to be gained from increased temperature and pressure levels and the cost in terms of hardware complexity and compressed air requirements for cooling the engine hot parts.

In a high bypass turbofan engine having a large fan diameter, the mechanical stress and tip efficiency limitations on fan tip speed have a substantial limiting effect on the hub pressure ratio capability of current engines. In the usual turbofan engine configuration, the portion of the fan blades adjacent the hub of the fan serve as a booster for compression of the core engine air, and ideally the rate of rotation of the fan hub and booster blades should approach the rate of rotation of the core compressor to maximize effectiveness of this booster (i.e. achieve a maximum pressure ratio per stage). This is not possible, however, because of the limitations imposed by the significantly larger overall diameter of the fan blades themselves. It is desirable, therefor, to provide an engine configuration which circumvents this limitation.

It is an object of this invention, therefore, to provide an engine configuration wherein fan speed does not provide a significant limitation to hub compression ratio obtainable from compression stages driven by the power turbine common to the fan and booster compressor stages.

BRIEF DESCRIPTION OF THE INVENTION

In accordance with the broad objectives cited above, an engine configuration is provided wherein the fan hub comprises a rotatable duct driven at fan speed and carrying at least one and preferably a plurality of rows of air foils on its interior surface. A rotor assembly having a similar number of air foil shaped blades is disposed in operative relationship with the air foils carried by the rotatable duct and driven in counter rotation with the fan, the counter rotation being effected by gearing means positively relating fan speed to the rotor speed. The output of the rotating duct and rotor combination is augmented by a higher pressure compressor which discharges its compressed air into a combustor from where the products of combustion sequentially pass through a high pressure turbine, a low pressure turbine, and an exhaust nozzle in the usual manner.

BRIEF DESCRIPTION OF THE DRAWINGS

While the invention is particularly pointed out and distinctly claimed in the claims appearing at the end of this specification, it is more readily understandable by reference to the description below and the accompanying drawings in which:

FIG. 1 is a cross section view of a turbofan engine;

FIG. 2 is a cross section view of a similar turbofan engine showing an alternate embodiment of the fan drive mechanism; and FIG. 3 is a cross section view of a turbofan engine showing a third embodiment of a fan drive mechanism.

DESCRIPTION OF THE PREFERRED EMBODIMENT

FIG. 1 illustrates a turbofan engine comprising generally a primary or core air flow path 10 and a secondary or bypass air flow path 12, each defined by various static and dynamic structural components. The static structure comprises a fan duct wall 14, a plurality of struts 16 circumferentially spaced around the engine and connecting the fan duct wall to the core engine casing 18, a plurality of struts 20 interposed in the primary air flow stream connecting the core engine casing 18 to the forward internal static structure 22 which is adapted to support the various rotating parts at the front of the engine, and a plurality of circumferentially spaced struts 24 at the rear of the engine which connect the engine casing 18 to rear static structure 26 adapted to support rotating parts at the rear of the engine. Other static structure is, of course, provided to support the combustor, stators, and air flow path defining sheet metal parts as required, the specific design of such structure being well within the capabilities of a person skilled in the gas turbine engine design arts.

The dynamic air flow path defining structure includes various surfaces on the rotating parts or rotors in the engine, which rotating parts are hereinafter described. The primary air flow path includes in sequence an inlet opening 28, a low pressure compressor 30, a high pressure compressor 32, combustor 34, high pressure turbine 36, low pressure turbine 38, and exhaust means 40.

The low pressure compressor 30 comprises a rotatably supported duct 42 whose exterior surface 44 in part defines the bypass flow path 12 and whose interior surface 46 in part defines the primary air flow path 10, duct 42 and fan 47 being secured to rotate in unison, fan blades 49 each being secured with a dovetail root structure 51 in structural ring 53, which forms a part of rotatable duct 42. The structure of the duct 42 supports at least one row of air foils 48 which correspond to stators of an ordinary compressor. The low pressure compressor rotor 50 comprises a spinner 52 fairing into a continuous surface which includes at least one row of air foil shaped rotor blades 54 operatively disposed in relation to air foils 48. Rotor 50 is supported on a tubular member or shaft 56 which extends a substantial portion of the length of the engine, and is adapted to rotate in a direction opposite the direction of rotation of duct 42.

The high pressure compressor 32 is of conventional design and comprises a plurality of rows of stator blades 58 secured to core engine casing 18 and a rotor 60 in part defining the inner surface of the annular core flow path 10. Rotor 60 includes a shaft portion 62 which is fixed to the high pressure turbine disk 64. Rotor 60 is supported by bearing means 66, 68 at static structure 22 and disk 70 respectively.

The high pressure and low pressure compressor turbines 36, 38 are of relatively conventional design comprising alternating rows of stator vanes 72 and rotor vanes 74, the rotor vanes being supported on structural disk members 64, 76 which are operatively connected to, in the case of high pressure turbine 36, shaft 62 which is integral with the high pressure rotor, and in the case of low pressure turbine 38, a shaft 78 which is connected at the forward end of the engine to the fan 47. Exit guide vanes comprising struts 24 are provided to straighten the hot gas flow into nozzle 40, which is shown as a mixing type nozzle wherein hot gas from the core engine is mixed with relatively cool gas in the fan duct before discharge to the atmosphere. Though a mixing chamber is shown, it does not form a part of this invention and other means for hot gas discharge could be used in an engine embodying the invention.

The shaft system in the engine comprises low pressure rotor shaft 56 and rotatable duct shaft 78, which is a hollow tubular member supported by bearing means 82, 84 and connected at its front end to fan disk 86 and at its aft end to low pressure turbine rotor 88. Low pressure rotor shaft 56 is supported by bearing 90 in shaft 78 and extends therethrough to a bearing 92 supported in the rear static structure 26 of the engine. A pinion 94 is secured to the rear of shaft 56 and meshes with one or more idler gears 96 which are supported in the rear static structure 26. A ring gear 98 having internally oriented teeth is meshed with idler gears 96 and is secured to the aft end of shaft 78. Thus, rotation of the low pressure turbine rotor 88 will be transmitted to the rotatably supported duct 42 and the fan 47 at turbine 38 rotor speed, and will be transmitted at an increased speed and opposite direction to the low pressure compressor rotor 50.

The structure provides several advantages over conventional turbofan engines. Low pressure turbine 38 speed can be optimized at a point within the limitations of both turbine 38 and fan 47 while at the same time the step up gearing for driving the low pressure compressor rotor 50 permits low pressure compressor rotor 50 speeds more nearly optimum for a low pressure compressor stage, and thus permits a low pressure hub pressure ratio of 2.5 – 4 with a minimum number of stages of moderate aerodynamic loading, which in turn permits a lower pressure ratio high pressure compressor and thus permits fewer high pressure turbine stages for given cycle parameters. In addition, the counter rotating feature of the low pressure compressor 30 permits additional performance within the mechanical limitations of the hardware inasmuch as the relative speed between the counter rotating compressor elements is one of the primary parameters determining low pressure air flow and pressure ratio. The gearing interconnection between the counter rotating elements is preferable to driving the counter rotating elements from two separate turbines, i.e., having a three turbine machine, in that a positive relationship between the counter rotating air foil elements is established; thus, the engine behaves as a conventional dual rotor machine without the off design matching problem of three independent spools. The gear arrangement, wherein the fan is driven from the low pressure turbine and only the power required by the low pressure rotor 50 is transmitted through the gear case, is additionally advantageous in that the horsepower capacity of the gearing means is only a small portion of the horsepower output of the low pressure turbine.

The alternate embodiment shown in FIG. 2 is similar to that shown in FIG. 1 in that it generally comprises primary and secondary air flow paths 100, 102 respectively, the secondary air flow path 102 including the fan 104, and the primary air flow path 100 including low and high pressure compressors 106, 108 respectively, a combustor 110, high and low pressure turbines 112, 114 respectively, and exhaust means 116. The structure of the FIG. 2 embodiment is similar to that of the FIG. 1 engine, except that the low pressure compressor, fan and gearing means are structured somewhat differently in FIG. 2. As shown in FIG. 2, the fan blades 104 are at the front of the rotatable low pressure compressor duct 118 and are driven by a shaft 120 which extends from the front of the engine to the rear portion thereof and is supported by bearing means 122 in front static structure 124 and bearing means 126 in the rear static structure 128 of the engine. The rotor 130 of the low pressure turbine 114 is secured to shaft 120 so as to drive the shaft and both fan 104 and duct 118 at turbine rotor speed. The low pressure compressor rotatable duct 118 supports on its interior at least one row of blades 132 aft of fan 104 and the low pressure compressor rotor 134 includes a similar number of rows of air foil shaped blades 136 in operative relation with the blades 132 supported in duct 118. The low pressure rotor 134 is supported by the front static structure 124 with bearing means 138 and includes a pinion 140 on a stub shaft 142 at the front of rotor 134. Pinion 140 is meshed with at least one idler gear 144 supported by the front static structure 124, which idler gear is in turn meshed with a ring gear 146 on the fan inlet spinner 148. Thus, rotor 134 will be driven in counter rotation to the duct 118 at a higher speed than that of duct 118.

FIG. 3 illustrates another embodiment of the invention wherein the gearing means is located in the forward portion of the engine and the low pressure compressor, i.e. booster, stages are forward of the fan. The general engine configuration is similar to that shown in FIG. 1 in that it comprises primary and secondary air flow paths 150, 152 generally as described above. The low pressure compressor 154 of FIG. 3 includes a rotor 156 forward of the fan which rotor includes at least one row of air foil shaped rotor blades 158. The rotor disk 159 of the low pressure turbine 160 is connected to shaft 162, which is supported by bearing 164 at the engine's rear static structure 166 and by bearing 168 at the engine's forward static structure 170. The rotatable duct 172, which includes fan blades 174 projecting from its outer surface, is supported on shaft 162 by suitable structure 176, structure 176 including a ring gear 178 having radially inwardly directed teeth meshed with an idler gear 180.

Rotor 156 is supported on structure 176 by a differential bearing 182, and includes a pinion 184 meshed with idler 180. Support for idler 180 is provided by a static torque tube 186 which is attached at its aft end to rear static structure 166. In operation, turbine 160 drives rotatable duct 172 and fan 174 in one direction, and rotor 156 is driven through the described gearing means in the opposite direction at a higher speed.

As in the embodiment shown in FIG. 1, the rotatable duct 172 extends forward of the fan blades 174 and includes at least one row of air foil shaped blades 188 which would correspond to stator blades in an engine of ordinary construction. Also, as in the embodiment of FIG. 1, the high pressure compressor 190 comprises a plurality of rows of stator blades 192 supported in the engine casing 194 and a rotor 196 having a plurality of rows of air foil shaped blades 198, rotor 196 being supported at its front end by bearing means 200 in the forward static structure 170 of the engine and at its aft end by bearing means 202 rotatably securing the high pressure turbine disk 204 to the low pressure rotor shaft 162.

Having above described three embodiments of the invention, though not exhaustive of all possible equivalents, what is desired to be secured by letters patent is set forth in the claims appearing below.

What is claimed is:

1. A gas turbine engine comprising
   inner and outer concentric annular ducts respectively defining primary and secondary flow paths for discharge of pressurized fluid streams from nozzle means;
   said inner duct having, in series flow relationship, a low pressure compressor, a high pressure compressor, a combustor, a high pressure turbine and a low pressure turbine;
   a first rotor having mounted thereon bladed elements of the high pressure compressor and bladed elements of the high pressure turbine;
   a second rotor having mounted thereon bladed elements of the low pressure compressor and fan blades projecting into the outer duct to pressurize air flow therethrough;
   a third rotor having other bladed elements of the low pressure compressor mounted thereon;
   one of the two rotors consisting of the second and third rotors having bladed elements of the low pressure turbine mounted thereon; and
   gearing means transmitting power between said second and third rotors and rotating said rotors in opposite directions.

2. A gas turbine engine as in claim 1 wherein
   a portion of the inner duct, defining the outer bounds of the primary flow path, is connected to the second rotor adjacent the hub portions of the fan blades and
   low pressure compressor blades project inwardly of said inner duct portion.

3. A gas turbine engine as in claim 2 wherein
   the bladed elements of the low pressure turbine are connected to the second rotor and the third rotor is driven by said second rotor through said gearing means, and said gear means drive the third rotor at a higher rotational speed than the second rotor.

4. A gas turbine engine as in claim 3 wherein said inner duct portion extends downstream of said fan blades, static structure extends between said low and high pressure compressors and underlies said third rotor, said third rotor is relatively short and is journaled on said underlying static structure and said gear means is supported on the forward end of said static structure.

5. A gas turbine engine as in claim 3 wherein said inner duct portion extends upstream of said fan blades the third rotor is journaled on the forward end of said second rotor, and the bladed elements of the low pressure compressor are disposed upstream of the fan blades.

* * * * *